2 Sheets—Sheet 1.
G. K. SMITH.
COMBINED COLTER AND JOINTER.
No. 192,538. Patented June 26, 1877.
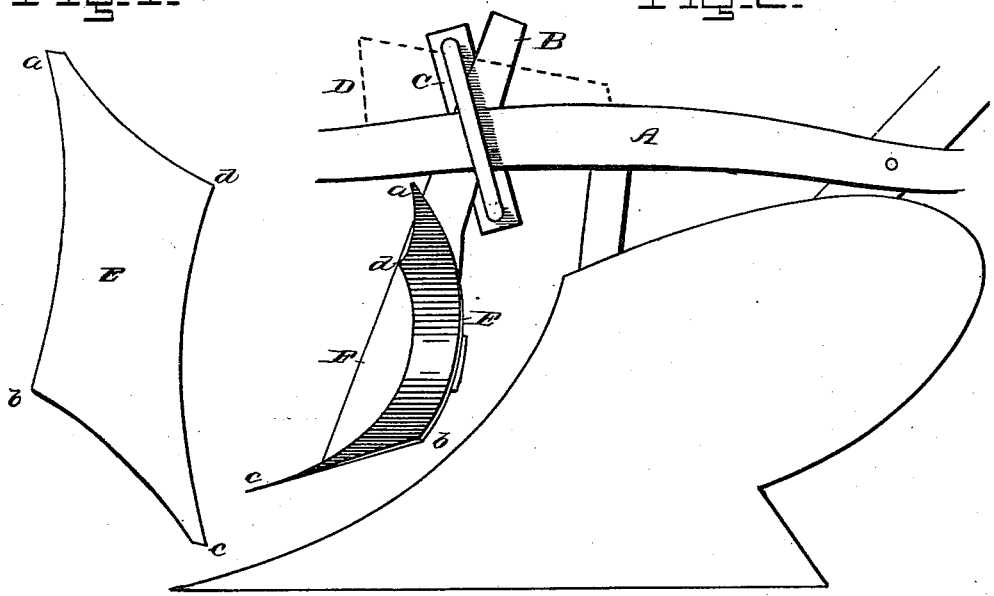
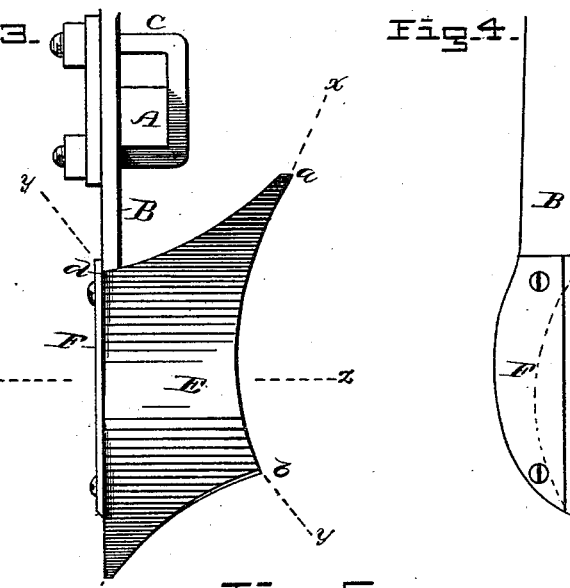
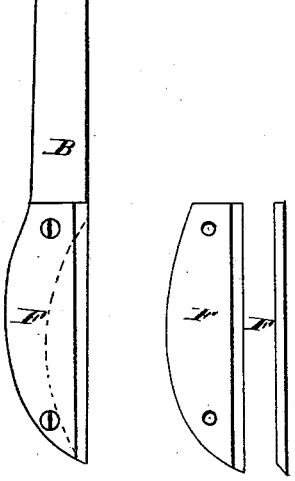
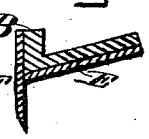
WITNESSES:
Jas. F. DuHamel
H. B. Brown
INVENTOR:
Geo. K. Smith
PER
H. J. Abbot
ATTORNEY.

G. K. SMITH.
COMBINED COLTER AND JOINTER.

No. 192,538.

2 Sheets—Sheet 2.

Patented June 26, 1877.

WITNESSES:
Jas. F. Duhamel
H. B. Brown

INVENTOR:
Geo. K. Smith.
PER
H. S. A. Hitt
ATTORNEY.

UNITED STATES PATENT OFFICE.

GEORGE K. SMITH, OF FREEPORT, ILLINOIS.

IMPROVEMENT IN COMBINED COLTER AND JOINTER.

Specification forming part of Letters Patent No. 192,538, dated June 26, 1877; application filed June 11, 1877.

*To all whom it may concern:*

Be it known that I, GEO. K. SMITH, of Freeport, in the county of Stephenson and State of Illinois, have invented certain new and useful Improvements in Combined Jointer and Colter; and I do hereby declare that the following is a full, clear, and exact description thereof, which will enable others skilled in the art to which it appertains to make and use the same.

My invention relates to the particular construction and arrangement of a combined jointer and colter for use on the class of plows used on prairie lands; and consists in a jointer of peculiar shape, adjustably connected to a plow-beam, and provided with a removable colter, all being so constructed that the colter may be removed and the jointer so adjusted as to cut a V-shaped slice from in front of the cutting-edge of the plow, as will be hereinafter more fully set forth and described.

In order to enable others skilled in the art to which my invention appertains to make and use the same, I will now proceed to describe its construction, arrangement, and operation, reference being had to the accompanying drawing, which forms a part of this specification, and in which—

Figure 6:
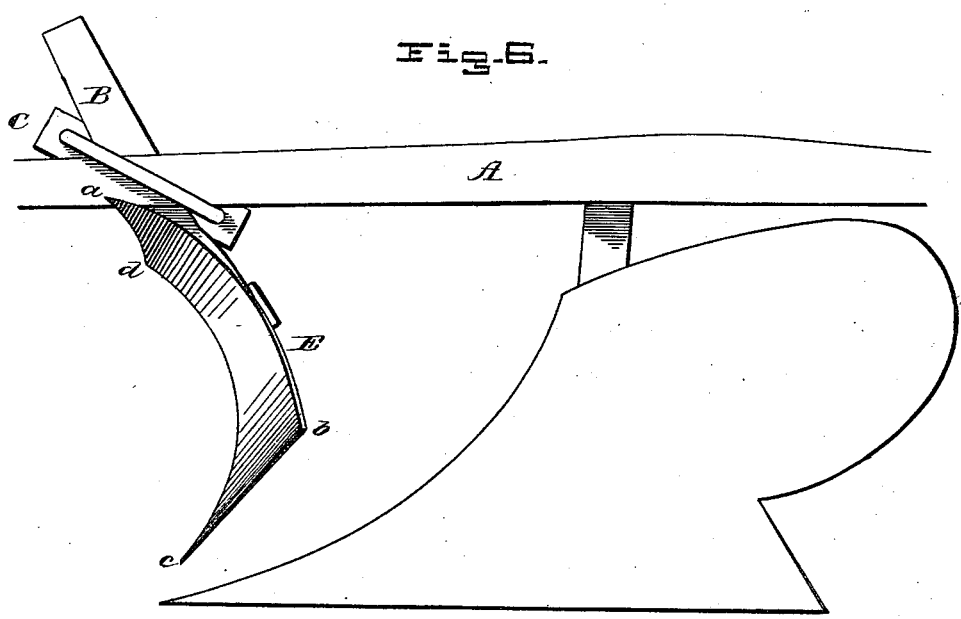
Figure 7:
Figure 8:
Figure 9:
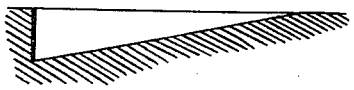
Figure 10:
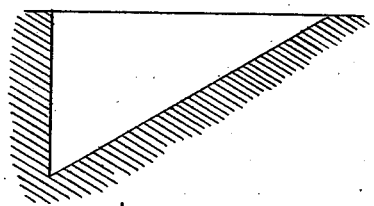

Figure 1 is a view of the blank from which the jointer is made. Fig. 2 is a side view of a prairie-plow with my jointer and colter adjusted for use in sodded land. Fig. 3 is a front view of jointer with colter attached. Fig. 4 shows views of colter. Fig. 5 is a cross-section taken upon the line $z\ z$ of Fig. 3. Fig. 6 is a side view of prairie-plow, with my jointer (colter removed) set for use in stubble-land, or where grain is down and lodged. Fig. 7 is a section taken upon the line $x\ x$ of Fig. 3. Fig. 8 is a section taken upon the line $y\ y$ of Fig. 3. Fig. 9 is a cross-section of the furrow made by the jointer when set as shown in Fig. 2; and Fig. 10 is a cross-section of the furrow made by the jointer when set as shown in Fig. 6.

A represents a plow-beam of suitable dimensions, to which the jointer-standard B is attached by an ordinary shackle, C, and made adjustable by means of a wedge, D.

The jointer consists of a concave steel plate, E, which is constructed by taking a flat piece of metal and cutting out the blank having points $a, b, c$, and $d$, and intervening curves shown in Fig. 1, and forming the jointer in the required shape by bending the blank in a true circle, as shown in Figs. 2, 3, 7, and 8.

The jointer is attached to the standard B by any suitable means in such position that the edge joining the standard shall be vertical, the side between $c$ and $d$ being a true curve. This will give the jointer E the backward slant (as shown in Fig. 5) necessary to throw the earth inward. This position also throws the point $c$ in the required position for cutting the different-shaped furrows desired, and the point $a$ in position to be cleared from trash when the jointer is used in stubble or lodged grain.

On the land-side of the standard B is attached a colter or cutting-bar, F, which may be removed, when required, either to be sharpened or replaced by a new one, or when the jointer is required for use without a colter.

This jointer is especially intended for use in the prairie lands of the West, where the soil is uniformly light and crisp, and where the high winds throw down and lodge much grain, and where it is customary to husk corn leaving the stalk standing in the field to be plowed under.

The object of my jointer is to cut a slice from one to three inches deep, according to adjustment, and five inches wide, tapering from its greatest depth on the land-side to an edge. This will cause the inner or upper side of the furrow-slice to be heavier than the outer or lower side, which my repeated experience has shown will assist the jointer in turning the slice and carrying the stubble with it.

In using my device the combined jointer and colter is adjusted as shown in Fig. 2 for plowing sodded land, where there is no stubble or other trash to clog, and makes a furrow of the shape shown in Fig. 9.

When stubble, lodged grain, or other trashy land is to be plowed, the colter is removed, and the jointer is adjusted as shown in Fig. 6. This position throws the point $c$ downward, and cuts a furrow of the shape shown in Fig. 10, and throws the point *a* upward and forward, so as to give the heavy furrow-slice more power to carry the trash with it.

I am aware that colters with adjustable shares and that plows with adjustable colters have been used, and do not desire to be understood as claiming these, broadly, as being my invention.

Having thus fully described my invention, what I claim as new, and desire to secure by Letters Patent, is—

The combination of the plow-beam A, standard B, jointer E, and removable colter F, substantially as shown and described.

In testimony that I claim the foregoing as my own I affix my signature in presence of two witnesses.

GEORGE K. SMITH.

Witnesses:
 H. S. ABBOT,
 ALBIN M. LONG.